United States Patent
Lee

(10) Patent No.: US 9,258,496 B2
(45) Date of Patent: *Feb. 9, 2016

(54) DIGITAL PHOTOGRAPHING APPARATUS AND METHOD OF CONTROLLING THE SAME

(71) Applicant: SAMSUNG ELECTRONICS CO., LTD., Suwon-si, Gyeonggi-do (KR)

(72) Inventor: Myung-hun Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,715

(22) Filed: Nov. 14, 2014

(65) Prior Publication Data

US 2015/0070543 A1 Mar. 12, 2015

Related U.S. Application Data

(63) Continuation of application No. 13/315,462, filed on Dec. 9, 2011, now Pat. No. 8,896,751.

(30) Foreign Application Priority Data

Mar. 7, 2011 (KR) .................. 10-2011-0019887

(51) Int. Cl.
| | |
|---|---|
| *H04N 5/335* | (2011.01) |
| *H04N 5/235* | (2006.01) |
| *H04N 5/341* | (2011.01) |
| *H04N 5/238* | (2006.01) |
| *G03B 9/14* | (2006.01) |
| *G03B 9/40* | (2006.01) |

(52) U.S. Cl.
CPC .................. *H04N 5/335* (2013.01); *G03B 9/14* (2013.01); *G03B 9/40* (2013.01); *H04N 5/238* (2013.01); *H04N 5/2353* (2013.01); *H04N 5/341* (2013.01)

(58) Field of Classification Search
CPC .......... H04N 5/2254; G03B 9/14; G03B 9/18; G03B 9/20; G03B 9/22; G03B 9/42
See application file for complete search history.

(56) References Cited

U.S. PATENT DOCUMENTS

| | | |
|---|---|---|
| 7,064,784 B2 | 6/2006 | Nakashita |
| 7,440,022 B2 | 10/2008 | Matsumoto |
| 8,107,003 B2 | 1/2012 | Matsumoto |
| 8,698,947 B2 | 4/2014 | Ryu et al. |
| 8,896,751 B2 * | 11/2014 | Lee ............................. 348/363 |
| 2004/0081446 A1 | 4/2004 | Compton |
| 2011/0122287 A1 | 5/2011 | Kunishige et al. |
| 2012/0274835 A1 | 11/2012 | Ogino et al. |

FOREIGN PATENT DOCUMENTS

JP    06-054252 A    2/1994

* cited by examiner

*Primary Examiner* — Daniel M Pasiewicz
(74) *Attorney, Agent, or Firm* — Drinker Biddle & Reath LLP

(57) ABSTRACT

A digital photographing apparatus and a method of controlling the same. A continuous shooting speed of the digital photographing apparatus may be improved by simultaneously performing a shutter operation and a read out operation of image data. A disclosed method of controlling a digital photographing apparatus includes displaying an image signal input through an image pickup device as a live view image, performing a first operation by driving a shutter, reading data from the image pickup device, and performing a second operation by driving the shutter during a time period overlapping the reading of the data.

10 Claims, 6 Drawing Sheets

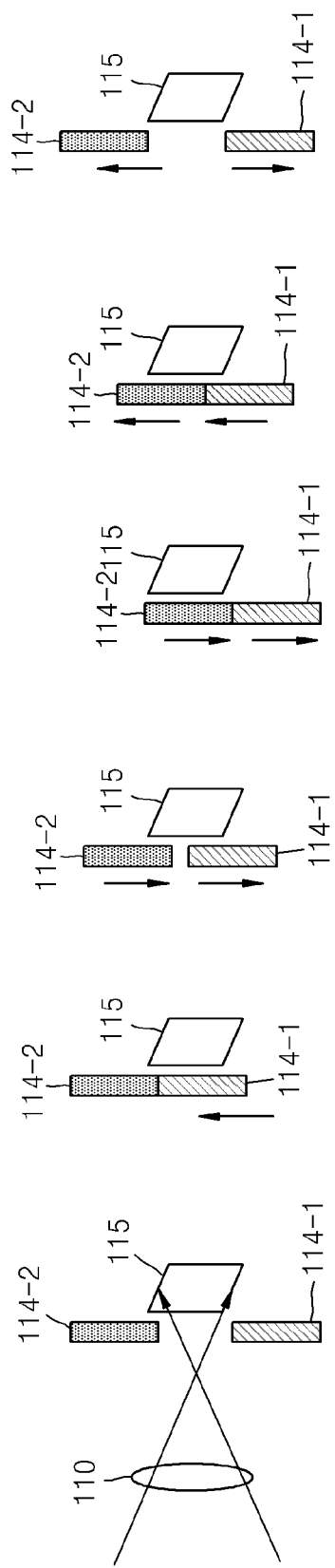

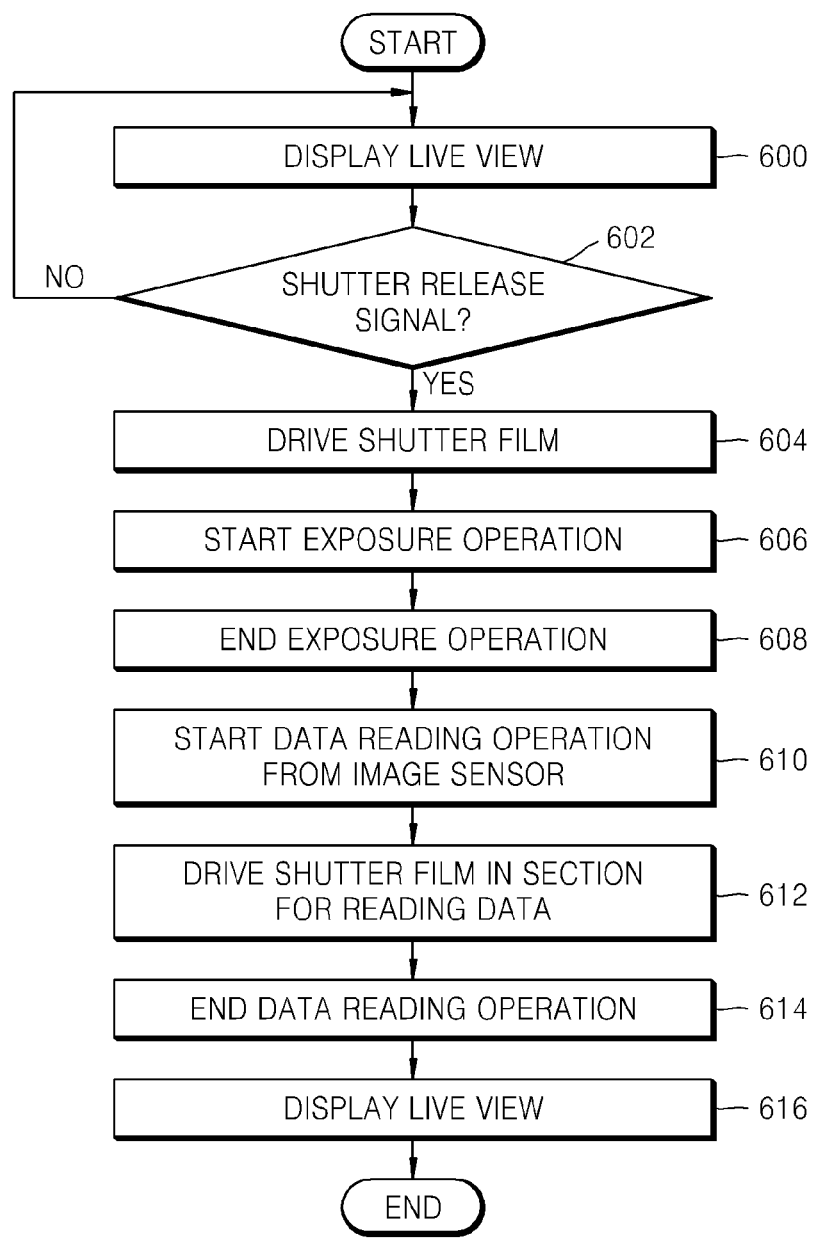

DIGITAL PHOTOGRAPHING APPARATUS AND METHOD OF CONTROLLING THE SAME

CROSS-REFERENCE TO RELATED PATENT APPLICATIONS

This application is a continuation of U.S. patent application Ser. No. 13/315,462 filed Dec. 9, 2011 which claims the priority benefit of Korean Patent Application No. 10-2011-0019887,filed on Mar. 7, 2011,in the Korean Intellectual Property Office, the disclosures of which are incorporated herein in the entirety by reference.

BACKGROUND

1. Field

The invention relates to a digital photographing apparatus and a method of controlling the same.

2. Description of the Related Art

Generally, when a focal plane shutter is used in a digital photographing apparatus, a continuous shooting speed of the digital photographing apparatus is directly affected by a shutter operating speed, an operation mechanism, and a read out time of imaging data from an image pickup device.

Here, imaging data can be read out from an image sensor only when the image sensor is completely blocked after exposure of the image sensor. Thus, the imaging data is read out when shutter operation has stopped.

SUMMARY

The invention provides a digital photographing apparatus and a method of controlling the same, wherein a continuous shooting speed is improved by performing a shutter operation and a read out operation of imaging data in parallel. That is, the continuous shooting speed is improved by simultaneously performing the read out operation and the shutter operation. In other words, the shutter operation at least partially overlaps the read out operation.

According to an aspect of the invention, there is provided a method of controlling a digital photographing apparatus, the method including: displaying an image signal input through an image pickup device as a live view image; performing a first operation by driving a shutter; reading data from the image pickup device; and performing a second operation by driving the shutter during a time period overlapping the reading of the data.

The time period may be before the reading of the data ends.

A front film and a rear film may be driven up and down in the shutter.

The method may including driving a front film of the shutter away from a rear film so as to display a next live view image after the second operation ends and after the reading of the data ends.

The performing of the second operation may include driving a front film and a rear film of the shutter in a same direction.

The performing of the second operation may include: driving a front film and a rear film of the shutter in a same direction during the reading of the data; and driving the front film away from the rear file when reading of the data ends.

The performing of the first operation may be performed in response to a shutter release signal.

The method may further include exposing the image pickup device to light after performing the first operation.

The shutter may be a focal plane shutter.

The reading of the data and the performing of the second operation may be performed during overlapping time intervals.

According to another aspect of the invention, there is provided a method of controlling a digital photographing apparatus, the method including: displaying a first live view image; performing a first operation by driving a shutter so as to perform a first photographing in response to a shutter release signal; exposing an image pickup device to light; reading data from the image pickup device; and performing a second operation by driving the shutter so as to display a second live view image while reading the data.

The performing of the second operation may include: driving a front film and a rear film of the shutter in a same direction during the reading of the data; and driving the front film away from the rear film after the reading of the data ends.

The method may further include: displaying the second live view image; and performing a second photographing in response to the shutter release signal.

The first photographing and second photographing may be continuous photographing operations.

According to another aspect of the invention, there is provided a digital photographing apparatus including: an image pickup device for photographing a subject; and a digital signal processor for outputting a first driving control signal for driving a shutter in response to a shutter release signal, reading data from the image pickup device, and outputting a second driving control signal for driving the shutter during the reading of the data.

The digital signal processor may include: a shutter drive controller for outputting the first and second driving control signals; and a data reader for reading the data from the image pickup device.

A front film and a rear film may be driven up and down in the shutter, the second driving control signal may be a signal for driving the front and rear films in a same direction during the reading of the data, and for driving the front film away from the rear film when the reading of the data ends.

The digital photographing apparatus may further include a display unit for displaying an image signal input through the image pickup device as a live view image according to control of the digital signal processor, wherein the digital signal processor controls the display unit to display a next live view image after the second driving control signal is output.

BRIEF DESCRIPTION OF THE DRAWINGS

The above and other features and advantages of the invention will become more apparent by describing in detail exemplary embodiments thereof with reference to the attached drawings in which:

FIGS. 3A to 3F are diagrams illustrating operations of a shutter film of FIG.1;

FIG. 6 is a flowchart representing a method of controlling a digital photographing apparatus, according to an embodiment of the invention.

DETAILED DESCRIPTION

Figure 1:
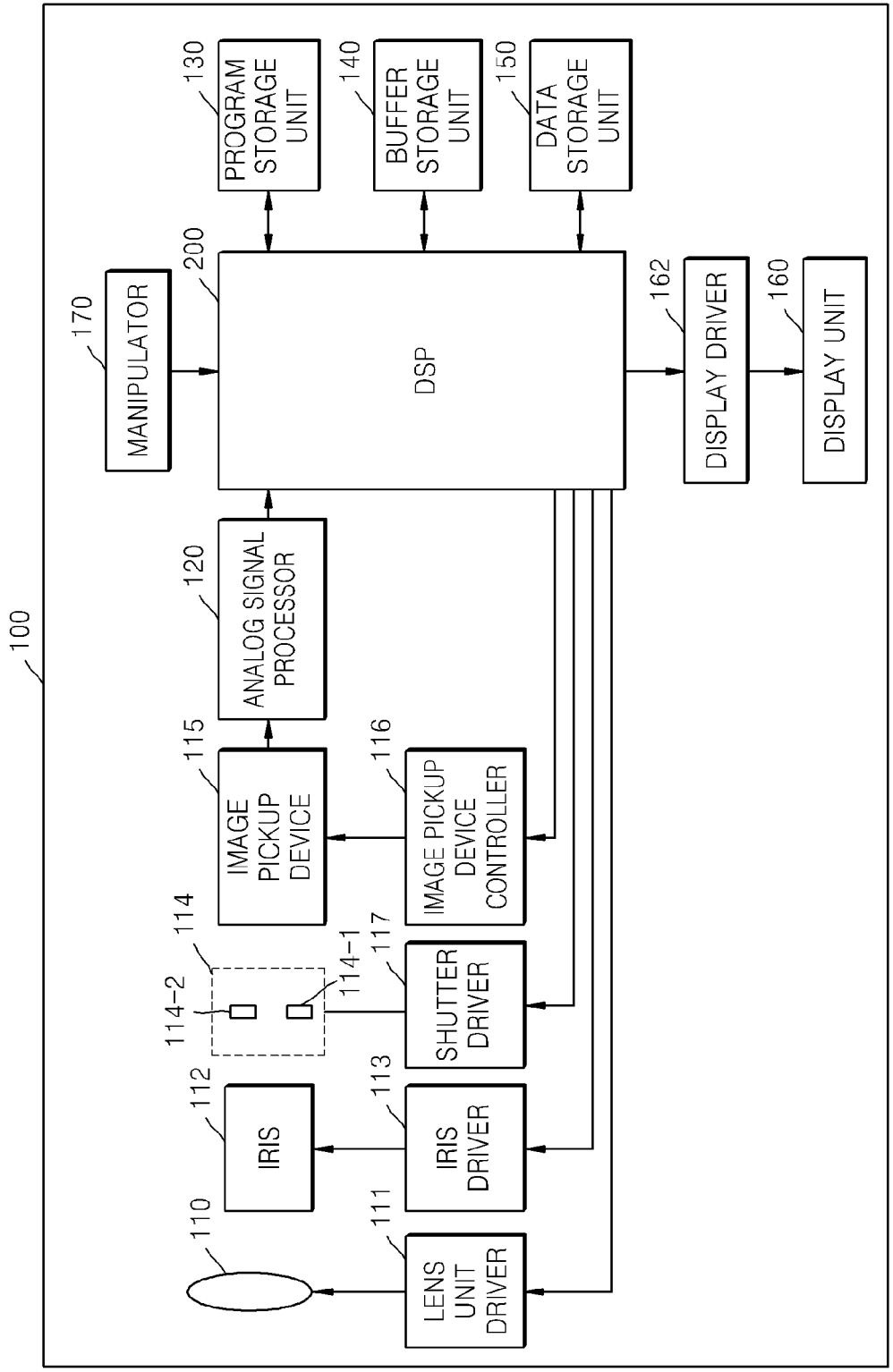
FIG. 1 is a block diagram illustrating a schematic structure of a digital photographing apparatus, according to an embodiment of the invention.

Hereinafter, the invention will be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Also, while describing the invention, detailed descriptions about related well-known functions or configurations that may diminish the clarity of the points of the invention are omitted.

It will be understood that although the terms first and second are used herein to describe various elements, these elements should not be limited by these terms. These terms are only used to distinguish one element from another element.

The terms used in the present specification are merely used to describe particular embodiments, and are not intended to limit the invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Embodiments of the invention will now be described in detail with reference to accompanying drawings. In drawings, like reference numerals denote like elements, and overlapping explanations are omitted.

FIG. 1 is a block diagram illustrating a schematic structure of a digital photographing apparatus according to an embodiment of the invention.

In FIG. 1, a digital camera 100 is illustrated as an example of the digital photographing apparatus. However, the digital photographing apparatus is not limited to the digital camera 100 of FIG. 1, and may be another digital device such as a camera phone, a personal digital assistant (PDA), or a portable multimedia player (PMP).

The digital camera 100 according to the current embodiment of the invention includes a lens unit 110, a lens unit driver 111, an iris 112, an iris driver 113, an image pickup device 115, an image pickup device controller 116, an analog signal processor 120, a program storage unit 130, a buffer storage unit 140, a data storage unit 150, a display driver 162, a display unit 160, a digital signal processor (DSP) 200, and a manipulator 170. Here, the lens unit 110, the lens unit driver 111, the iris 112, the iris driver 113, a shutter 114, a shutter driver 117, the image pickup device 115, the image pickup device controller 116, and the analog signal processor 120 may be referred to collectively as an imaging unit.

The shutter 114 includes a front film 114-1 and a rear film 114-2, which are driven up and down according to a driving control signal of the shutter driver 117. Here, the shutter 114 is a focal plane shutter. Generally, a focal plane shutter includes two cloth films or metal films on the right and left of or above and below a lens, or directly before a focal surface of the lens, and suitably exposes a photosensitive material surface by adjusting slits of a front film and a rear film, or moving speeds of the front and rear films. The focal plane shutter is most often used in a lens-exchangeable camera. Moreover, the focal plane shutter is used most often in a camera having an imaging sensor smaller than or equal to 6 centimeters (cm)×6 cm, and determines a film speed and determines an exposure time by only adjusting a slit width using a speed regulator or an electromagnet that is electrically controlled. Main characteristics of the focal plane shutter are that an exchangeable lens may be used, and a high speed shutter is easily realized.

The lens unit 110 focuses an optical signal. The lens unit 110 may include a zoom lens for narrowing or widening a view angle according to a focal length, and a focus lens for adjusting a focus on a subject. The zoom lens and the focus lens may each be realized in one lens, or a group of a plurality of lenses.

The iris 112 adjusts an amount of incident light by adjusting a degree of opening and closing of the iris 112.

The lens unit driver 111 and the iris driver 113 receive a respective control signal from the DSP 200 to respectively drive the lens unit 110 and the iris 112. The lens unit driver 111 adjusts a focal length by adjusting a location of a lens, and performs auto focusing, zoom change, focus change, etc. The iris driver 113 adjusts the degree of opening and closing of the iris 112, and specifically, performs auto focusing, automatic exposure correction, focus change, depth of field adjustment, or the like by adjusting an f number or an iris value.

The optical signal passed through the lens unit 110 forms an image of a subject on a light-receiving surface of the image pickup device 115. The image pickup device 115 may use a charge coupled device (CCD), a complementary metal oxide semiconductor image sensor (CIS), or a high-speed image sensor that converts the optical signal to an electric signal. Sensitivity or the like of the image pickup device 115 may be adjusted by the image pickup device controller 116. The image pickup device controller 116 may control the image pickup device 115 according to a control signal automatically generated based on an image signal that is input in real time, or a control signal manually input by a user.

An exposure time of the image pickup device 115 is adjusted according to a driving speed of the shutter 114. The front film 114-1 and the rear film 114-2 move while having a slit having a predetermined interval therebetween to adjust an amount of light incident on the image pickup device 115.

The analog signal processor 120 performs a noise reduction process, gain adjustment, waveform normalization, and an analog-digital converting process on an analog signal supplied from the image pickup device 115.

An external control signal from a user or the like may be input to the manipulator 170. The manipulator 170 may include a shutter-release button that outputs a shutter-release signal for capturing a picture by exposing the image pickup device 115 to light for a predetermined time, a power button that receives a control signal for controlling on or off of a power supply, a wide-zoom button and a tele-zoom button for widening or narrowing a view angle according to an input, and other various functional buttons for inputting a character, selecting a mode such as a photographing mode or a reproduction mode, selecting a white balance setting function, and selecting an exposure setting function. According to an embodiment of the invention, the user may select an auto image process mode via the manipulator 170. Here, in the auto image process mode, an image processing type or an image processing intensity is automatically set based on surrounding brightness, instead of being manually set by the user. The manipulator 170 may include various buttons as described, but alternatively, the manipulator 170 may be realized in any form for receiving an input from the user, such as a keyboard, a touch pad, a touch screen, or a remote controller.

The digital camera 100 includes the program storage unit 130 for storing a program such as an operating system or application system for driving the digital camera 100, the buffer storage unit 140 for temporarily storing data required during an operation or data obtained via the operation, and the data storage unit 150 for storing various types of information required for the program such as an image file including an image signal.

Further, the digital camera 100 includes the display unit 160 for displaying an operation state of the digital camera 100 or image information captured by the digital camera 100. The display unit 160 may provide visual or auditory information to the user. In order to provide the visual information, the display unit 160 may include a liquid crystal display (LCD) panel, an organic light emitting display (OLED) panel, or the like. The display driver 162 provides a drive signal to the display unit 160.

Also, the digital camera 100 includes the DSP 200 for processing a received image signal, and controlling each element according to the processed image signal or an external input signal. The DSP 200 reduces noise in received image data, and may perform an image signal process for improving image quality such as gamma correction, color filter array interpolation, color matrix, color correction, or color enhancement. Also, the DSP 200 may generate an image file by compressing image data generated by the image signal process for improving image quality, or restore image data from the image file. An image may be compressed reversibly or irreversibly. The image may be converted to a joint photographic experts group (JPEG) format or a JPEG 2000 format. The compressed image data may be stored in the data storage unit 150. The DSP 200 may perform a clearness process, a color process, a blur process, an edge emphasizing process, an image analyzing process, an image recognizing process, or an image effect process. The image recognizing process may be performed by recognizing a face or a scene. For example, the DSP 200 may perform luminance level adjustment, color correction, contrast adjustment, outline emphasizing adjustment, a screen dividing process, character image generation, or an image synthesizing process.

Also, the DSP 200 may execute the program stored in the program storage unit 130, generate a control signal for controlling auto focusing, zoom change, focus change, automatic exposure correction, or shutter drive using a separate module to provide the control signal to the lens unit driver 111, the iris driver 113, the image pickup device controller 116, or the shutter driver 117, and control overall operations of the elements included in the digital camera 100.

The DSP 200 outputs a driving control signal for driving the shutter 114 in response to the shutter release signal output by the manipulator 170. Also, the DSP 200 performs an exposure operation by driving the shutter 114 to transmit light to the image pickup device 115, and a data reading operation for reading an electric signal (hereinafter, referred to as data, an image signal, or an input image) accumulated through the image pickup device 115. Also, the DSP 200 starts to output a driving control signal again for driving the shutter 114 during the reading of the data from the image pickup device 115, so that the data is read while the shutter 114 is driven to prepare for a next photographing.

Figure 2:
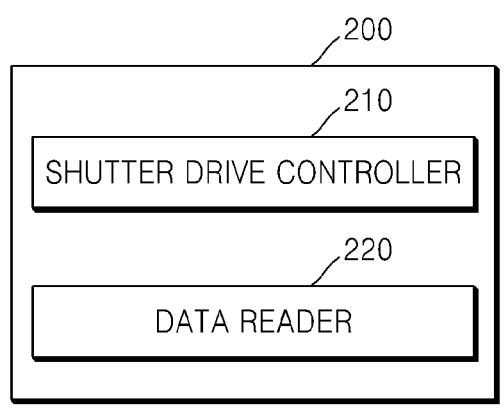
FIG. 2 is a detailed block diagram of the digital signal processor of FIG. 1, according to an embodiment of the invention.

FIG. 2 is a detailed block diagram of the DSP 200 of FIG. 1, according to an embodiment of the invention.

Referring to FIG. 2, the DSP 200 includes a shutter drive controller 210 and a data reader 220. The shutter drive controller 210 outputs a first driving control signal and a second driving control signal. Here, the first driving control signal is a signal for enabling the shutter 114 to perform an exposure operation and a data reading operation in response to a shutter release signal. The second driving control signal is a signal for enabling the shutter 114 to prepare for another exposure operation and is output during the reading of the data. Operations of the shutter 114 will be described in detail later with reference to FIGS. 3A through 3F.

The data reader 220 reads data from the image pickup device 115.

Movements of the shutter 114 related to an overall photographing operation will now be described with reference to FIGS. 3A through 3F.

FIG. 3A shows a live view state. A live view is a state where a user photographs via the display unit 160, for example, a liquid crystal display (LCD), instead of a view finder. Accordingly, the front film 114-1 and the rear film 114-2 of the shutter 114 are both opened, and, thus, light passed through the lens unit 110 forms an image on the image pickup device 115.

FIG. 3B shows a closed state of shutter. A photographing operation starts as the user completely presses the shutter release button. The front film 114-1 is driven upward to combine with the rear film 114-2 according to a shutter release signal corresponding to the shutter release button, as shown in FIG. 3B, and the shutter 114 maintains the closed state so that the light is not transmitted to the image pickup device 115.

FIG. 3C shows an exposure state. After the front film 114-1 is driven upward to combine with the rear film 114-2 as shown in FIG. 3B, an exposure operation is performed by driving the front film 114-1 and the rear film 114-2 downward while maintaining a slit having a predetermined interval between the front and rear films 114-1 and 114-2, as shown in FIG. 3C. Here, the slit is obtained via a starting time difference between the front and rear films 114-1 and 114-2, and an exposure time may be adjusted according to movement speeds of the front and rear films 114-1 and 114-2. Accordingly, the exposure operation is performed via the slit of the front and rear films 114-1 and 114-2.

FIG. 3D shows an exposure completion state. The front and rear films 114-1 and 114-2 are driven downward, and then the rear film 114-2 is driven further to contact the front film 114-1, as shown in FIG. 3D. Reading of data accumulated in the image pickup device 115 is started when the exposure is completed, i.e., when no additional light enters the image pickup device 115, since a data reading operation is only performed when the image pickup device 115 is completely blocked from light.

FIG. 3E shows an opening preparation state. Driving of the front and rear films 114-1 and 114-2 of the shutter 114 back to an opened state is started at a time during the reading of the data in FIG. 3D. In other words, as shown in FIG. 3E, the front and rear films 114-1 and 114-2 are driven upward while contacting each other. Since the image pickup device 115 is closed while the first and rear films 114-1 and 114-2 are driven, the data reading operation of the image pickup device 115 can continue during the opening preparation.

FIG. 3F shows the opened state. After the front and rear films 114-1 and 114-2 are driven upward, the front film 114-1 is driven downward after a time when the data reading operation ends, and the rear film 114-2 is continuously driven upward so that the image pickup device 115 is completely opened. FIG. 3F shows the live view state, like FIG. 3A.

Figure 4A:
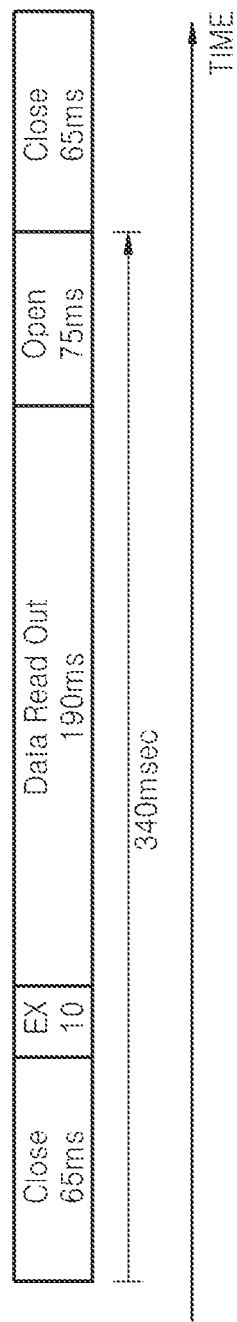
FIGS. 4A and 4B are diagrams illustrating, respectively, a conventional photographing operation and a photographing operation according to an embodiment of the invention.
Figure 4B:
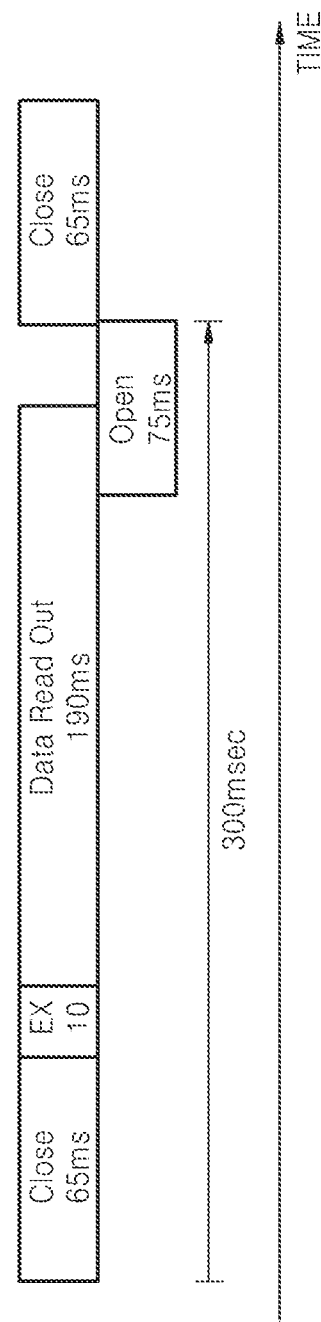

FIGS. 4A and 4B are diagrams for respectively describing a conventional photographing operation and a photographing operation according to an embodiment of the invention. A time required for photographing associated with the shutter operation will now be described with reference to FIGS. 3A through 3F, 4A, and 4B. Here, data processing speeds of an image pickup device, a shutter, and a DSP, which are elements for determining an exposure time, a data reading time, or the like, are considered to be the same. FIG. 4A is a diagram for describing a conventional shutter operation and a time required for photographing corresponding to the conventional shutter operation.

Referring to FIGS. 3A through 3F and 4A, when the shutter release button is completely pressed in the live view state of FIG. 3A, 65 milliseconds (ms) is spent in the closed state corresponding to FIG. 3B, and 10 ms is spent for the exposure corresponding to FIG. 3C. After the exposure is completed, 190 ms is spent for the data reading operation. After the data reading operation is completed, 75 ms is spent to start the opening operation corresponding to FIG. 3E and maintain the opened state of FIG. 3F. Accordingly, a total of 340 ms is spent as a total photographing time, i.e., from pressing the shutter release button to preparing for a next photographing in a live view. Such a time is also referred to as a shot to shot (STS) time.

FIG. 4B is a diagram for describing a shutter operation, according to an embodiment of the invention, and a time required for photographing corresponding to the shutter operation.

Referring to FIGS. 3A through 3F and 4B, when the shutter release button is completely pressed in the live view state of FIG. 3A, 65 ms is spent in the closed state corresponding to FIG. 3B, and 10 ms is spent in the exposure corresponding to FIG. 3C. After the exposure is completed, 190 ms is spent in the data reading operation. According to the current embodiment of the invention, the opening preparation operation is started at a time overlapping the reading data operation. In FIG. 4B, the opening operation corresponding to FIG. 3E is started at a time when 150 ms of the data reading time has passed. Since the front and rear films 114-1 and 114-2 are driven upward while contacting each other for a predetermined time, the image pickup device 115 still maintains the closed state and the data reading operation can continue during this time. Then, at a time when the data reading operation ends, i.e., 190 ms after the data reading starts, the front film 114-1 is driven downward again to achieve the live view for a next photographing by maintaining the opening state of FIG. 3F. Accordingly, an STS time in the current embodiment of the invention is 300 ms. Thus, the STS time in FIG. 4B may be shorter than the STS time in FIG. 4A by 40 ms, and when the STS times are converted into terms of continuous shooting speeds, the continuous shooting speed of FIG. 4A is 2.94 frames per second (fps) while the continuous shooting speed of FIG. 4B is greater at 3.36 fps. Also, a live view image for a next photographing after a current photographing may be shown to the user 40 ms faster.

Figure 5A:
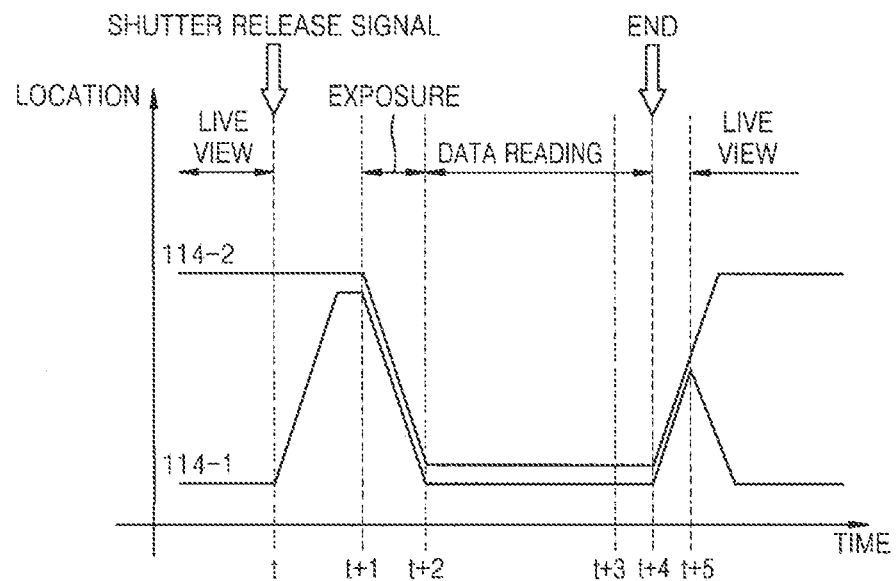
FIGS. 5A and 5B are graphs illustrating, respectively, operations of a front film and a rear film, according to an conventional technology and according to an embodiment of the invention.
Figure 5B:
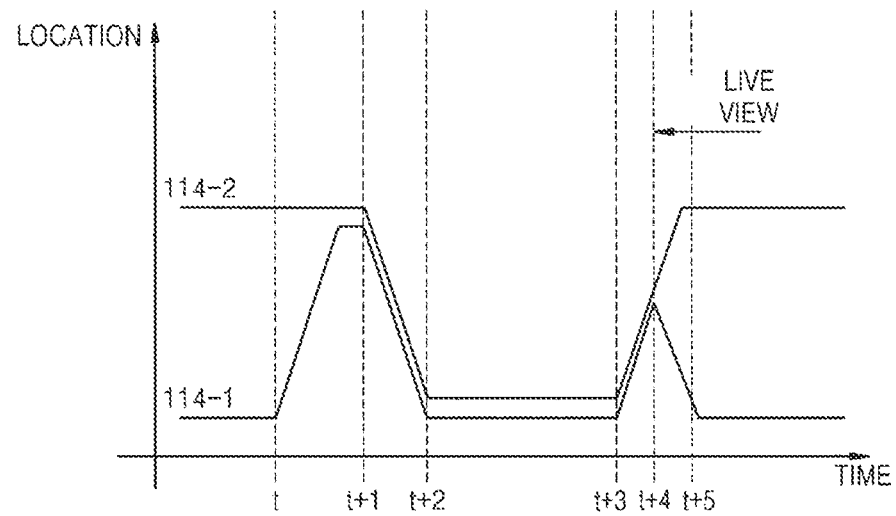

FIG. 5A is a graph illustrating operations of a front film 114-1 and a rear film 114-2 according to conventional technology, and FIG. 5B is a graph illustrating operations of a front film 114-1 and a rear film 114-2 according to an embodiment of the invention.

Referring to FIGS. 5A and 5B, the front film 114-1 and the rear film 114-2 maintain an opened state while displaying a live view until a time t. When a shutter release signal is input at the time t, the front film 114-1 elevates before a time t+1 and then maintains a uniform slit interval relative to the rear film 114-2 to prepare to effect an exposure. An exposure operation is performed from the time t+1 to a time t+2. During this time, the front film 114-1 and the rear film 114-2 descend while maintaining the predetermined slit interval. A data reading operation is performed from the time t+2 to a time t+4.

According to the current embodiment of the invention, the front film 114-1 and the rear film 114-2 elevate while contacting each other starting at a time t+3, which is a time before the time t+4. As shown in FIG. 5B, the time t+3 is a time occurring with the time interval t+2 to t+4 for reading data. In other words, the time t+3 is a time before the data reading operation ends. In the current embodiment of the invention, the front film 114-1 and the rear film 114-2 elevate together from the time t+3 to the time t+4 (a time when the data reading operation ends), and the front film 114-1 descends at the time t+4. Accordingly, a live view for a next photographing may be displayed from the time t+4.

However, as shown in FIG. 5A, the front film 114-1 and the rear film 114-2 are stopped until the time t+4, according to the conventional technology, and the front film 114-1 and the rear film 114-2 start only to elevate at the time t+4, that is, the time when the data reading operation ends. Then, the front film 114-1 starts to descend at a time t+5 to display a live view.

Accordingly, as shown in FIG. 5B, an STS time and a live view display time for a next photographing according to the current embodiment of the invention may be reduced by a difference between the time t+3 and the time t+4 compared to the conventional technology.

FIG. 6 is a flowchart representing a method of controlling a digital photographing apparatus, according to an embodiment of the invention.

Referring to FIG. 6, a live view is displayed in operation 600. When a shutter release signal is input in operation 602, a shutter film is driven in operation 604, and when the shutter release signal is not input in operation 602, the live view is continuously displayed in operation 600. An exposure operation is started by driving the shutter film in operation 606, and the exposure operation ends after a predetermined time, i.e., when an exposure time ends, in operation 608.

In operation 610, a data reading operation starts to be performed in an image sensor. Here, data is read only when the image sensor is completely blocked from light. Accordingly at this time, the shutter film completely blocks the image sensor.

In operation 612, the shutter film is driven during a time interval for reading the data. In other words, the shutter film is driven for a next photographing during the data reading operation of operation 610. In detail, since a front film and a rear film elevate while contacting each other, the image sensor is blocked, and, thus, the data reading operation is not affected even while the shutter film is driven for a next photographing.

In operation 614, the data reading operation ends. A live view is displayed in operation 616 by descending the front film at a time after the data reading operation ends.

According to the embodiments of the invention, a continuous shooting speed may be improved by performing a shutter operation and a read out operation of imaging data in parallel.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as" or "for example") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of controlling an electronic device, the method comprising:
    displaying an image based on an image signal input through an image pickup device;
    driving a shutter in response to a capturing signal, wherein the shutter comprises a front film and a rear film;
    reading data from the image pickup device during a data reading time period;
    driving the front film and the rear film of the shutter during a time interval overlapping the data read time period, wherein the front film is driven away from the rear film when the data reading time period ends; and
    displaying a next image when the data reading time period ends.

2. The method of claim 1, wherein the next image is displayed as a next live view image after the data reading time period ends.

3. The method of claim 1, wherein the shutter is a focal plane shutter.

4. A method of controlling a digital photographing apparatus, the method comprising:
    displaying a first live view image;
    performing a first operation by driving a shutter so as to perform a first image capturing operation in response to a shutter release signal, wherein the shutter comprises a front film and a rear film;
    exposing an image pickup device to light;
    reading data from the image pickup device during a data reading time period; and
    performing a second operation by driving the front film and the rear film of the shutter during a time interval overlapping the data reading time period so as to display a second live view image while reading the data, wherein the performing of the second operation comprises:
        driving the front film and the rear film in a same direction before the data reading time period ends, and
        driving the front film away from the rear film when the data reading time period ends.

5. The method of claim 4, further comprising:
displaying the second live view image; and
performing a second photographing in response to the shutter release signal.

6. The method of claim 4, wherein the first photographing and second photographing are continuous photographing operations.

7. An electronic device comprising:
a shutter comprising a front film and a rear film;
an image pickup device that photographs a subject; and
a digital signal processor that displays an image based on an image signal input through the image pickup device, drives the shutter in response to a capturing signal, reads data from the image pickup device during a data reading time period, drives the front film and the rear film of the shutter during a time interval overlapping the data reading time period in response to a second driving control signal, and displays a next image when the data reading time period ends, wherein the front film is driven away from the rear film when the data reading time period ends.

8. The electronic device of claim 7, wherein the digital signal processor comprises:
a shutter drive controller that outputs driving control signals; and
a data reader that reads the data from the image pickup device.

9. The electronic device of claim 7, wherein the front film and the rear film are driven up and down in the shutter, the second driving control signal is a signal for driving the front and rear films in a same direction during the time interval and for driving the front film away from the rear film when the data reading time period ends.

10. The electronic device of claim 7, further comprising a display unit that displays an image signal input through the image pickup device as a live view image according to control of the digital signal processor, wherein the digital signal processor controls the display unit to display a next live view image after the second driving control signal is output.

* * * * *